(12) United States Patent
de Cesare et al.

(10) Patent No.: US 9,617,931 B2
(45) Date of Patent: Apr. 11, 2017

(54) METHOD TO CONTROL A SUPERCHARGED INTERNAL COMBUSTION ENGINE PROVIDED WITH A TURBOCHARGER BY MEANS OF AN ESTIMATION OF THE AVERAGE POWER DELIVERED BY THE TURBINE OF THE TURBOCHARGER

(71) Applicant: Magneti Marelli S.p.A., Corbetta (IT)

(72) Inventors: Matteo de Cesare, Torremaggiore (IT); Federico Covassin, Corbetta (IT); Fabrizio Ponti, Forli (IT); Vittorio Ravaglioli, Corbetta (IT)

(73) Assignee: Magneti Marelli S.p.A., Corbetta (IT)

( * ) Notice: Subject to any disclaimer, the term of this patent is extended or adjusted under 35 U.S.C. 154(b) by 227 days.

(21) Appl. No.: 14/679,552

(22) Filed: Apr. 6, 2015

(65) Prior Publication Data

US 2015/0337747 A1    Nov. 26, 2015

(30) Foreign Application Priority Data

Apr. 7, 2014 (IT) .............. BO2014A0197
Apr. 7, 2014 (IT) .............. BO2014A0198

(51) Int. Cl.
  *F02B 37/12*   (2006.01)
  *F02D 41/00*   (2006.01)
  (Continued)

(52) U.S. Cl.
  CPC .......... *F02D 41/0007* (2013.01); *F02B 37/12* (2013.01); *F02D 41/107* (2013.01);
  (Continued)

(58) Field of Classification Search
  CPC .................. F02D 41/0007; F02B 37/1222
  (Continued)

(56) References Cited

U.S. PATENT DOCUMENTS

| 3,815,426 A | 6/1974 | Rohner |
| 2007/0016385 A1 | 1/2007 | Barila et al. |

(Continued)

FOREIGN PATENT DOCUMENTS

| DE | 102004010263 A1 | 9/2005 |
| DE | 102005054736 A1 | 5/2007 |

(Continued)

OTHER PUBLICATIONS

Nov. 28, 2014 Italian Search Report for Italian Patent Application No. BO20140197.

(Continued)

*Primary Examiner* — Mahmoud Gimie
(74) *Attorney, Agent, or Firm* — Howard & Howard Attorneys PLLC (57) ABSTRACT

A method to control a supercharged internal combustion engine by means of a turbocharger provided with a turbine and a compressor which compresses the air taken in; the control method includes the steps of determining the instantaneous rotation speed of the turbocharger; and calculating the average power delivered by the turbine as a function of the absolute value of the j-th harmonic component of the instantaneous rotation speed of the turbocharger and of the instantaneous rotation speed of the turbocharger; and controlling the supercharged internal combustion engine as a function of the average power delivered by the turbine.

23 Claims, 5 Drawing Sheets

(51) Int. Cl.
*F02D 41/18* (2006.01)
*F02D 41/10* (2006.01)
*F02D 41/26* (2006.01)
*F02D 41/28* (2006.01)

(52) U.S. Cl.
CPC .............. *F02D 41/18* (2013.01); *F02D 41/26* (2013.01); *F02B 2037/122* (2013.01); *F02D 2041/288* (2013.01); *Y02T 10/144* (2013.01)

(58) Field of Classification Search
USPC ......... 701/102; 123/559.1, 564; 73/584, 587
See application file for complete search history.

(56) References Cited

U.S. PATENT DOCUMENTS

| | | |
|---|---|---|
| 2009/0193896 A1 | 8/2009 | Rose et al. |
| 2012/0016602 A1* | 1/2012 | Fontvieille .............. F02B 39/16 702/44 |
| 2012/0222417 A1* | 9/2012 | Fontvieille .............. F02D 23/00 60/602 |

FOREIGN PATENT DOCUMENTS

| | | |
|---|---|---|
| DE | 102011016489 A1 | 10/2012 |
| EP | 2392803 A1 | 12/2011 |
| FR | 2932224 A1 | 12/2009 |
| FR | 2937379 A1 | 4/2010 |
| FR | 2941267 A1 | 7/2010 |
| WO | 9417420 A1 | 8/1994 |
| WO | 2006137142 A1 | 12/2006 |
| WO | 2013045785 A1 | 4/2013 |

OTHER PUBLICATIONS

Jan. 9, 2015 Italian Search Report for Italian Patent Application No. BO20140198.

Nicolo Cavina et al. "Exhaust Gas Turbocharger Speed Measurement Via Acoustic Emission Analysis," SAE International, Apr. 14, 2008, XP055154152.

Davide Moro et al. "Upgrade of a Turbocharger Speed Measurement Algorithm Based on Acoustic Emission," SAE International, Apr. 20, 2009, XP055154167.

Fabrizio Ponti et al. "Non-Intrusive Methodology for Estimation of Speed Fluctuations in Automotive Turbochargers under Unsteady Flow Conditions," Apr. 1, 2014, XP055154176.

* cited by examiner

METHOD TO CONTROL A SUPERCHARGED INTERNAL COMBUSTION ENGINE PROVIDED WITH A TURBOCHARGER BY MEANS OF AN ESTIMATION OF THE AVERAGE POWER DELIVERED BY THE TURBINE OF THE TURBOCHARGER

TECHNICAL FIELD

The present invention relates to a method to control a supercharged internal combustion engine provided with a turbocharger by means of an estimation of the average power delivered by the turbine of the turbocharger.

PRIOR ART

A supercharged internal combustion engine is provided with a turbocharger (a turbocharger actuated by the exhaust gases or a volumetric turbocharger actuated by the driving shaft) which, in certain moments, compresses the air taken in to increase the volumetric efficiency. Due to the action of the turbocharger, in a supercharged internal combustion engine, a light depression may be present in the plenum of the intake manifold, determined by the intake action generated by the cylinders (inactive turbocharger), or an overpressure may be present, determined by the compressing action of the turbocharger (active turbocharger). Therefore, in a supercharged internal combustion engine, it is important to control the rotation speed of a compressor of the turbocharger accurately, which determines the overpressure in the plenum of the intake manifold.

The known solution used to determine the rotation speed of the compressor includes the arrangement of a sensor (preferably a Hall effect or eddy current sensor) which detects the passage of the compressor blades and determines the speed of the turbocharger itself as a function of the frequency of passage of the blades. The sensor is normally fixed to a wall of a compressor diffuser in a position facing and close to the blades.

However, this solution has a drawback in that it ensures unsatisfactory performance in terms of reliability, and moreover it requires mechanical machining on the compressor which could be time-consuming and costly.

Furthermore, in a supercharged internal combustion engine, it is also greatly important to control the power delivered by the turbine of the turbocharger accurately. For example, the turbocharger lubrication (i.e., the quantity of control fluid circulated by a lubrication pump) and conditioning are managed by an open-loop control unit by means of an estimation of the power dissipated by the turbocharger in the most severe operating conditions; such a solution is clearly inefficient and results in an obvious waste of the control fluid used for lubricating the turbocharger.

DESCRIPTION OF THE INVENTION

It is the object of the present invention to provide a method to control a supercharged internal combustion engine provided with a turbocharger by means of an estimation of the average power delivered by the turbine of the turbocharger, which control method is free from the drawbacks of the prior art, and in particular is easy and cost-effective to be implemented.

According to the present invention, a method to control a supercharged internal combustion engine provided with a turbocharger by means of an estimation of the average power delivered by the turbine of the turbocharger is provided as claimed in the appended claims.

BRIEF DESCRIPTION OF THE DRAWINGS

The present invention will now be described with reference to the accompanying drawings, which illustrate a non-limiting embodiment thereof, in which.

PREFERRED EMBODIMENTS OF THE INVENTION

Figure 1:
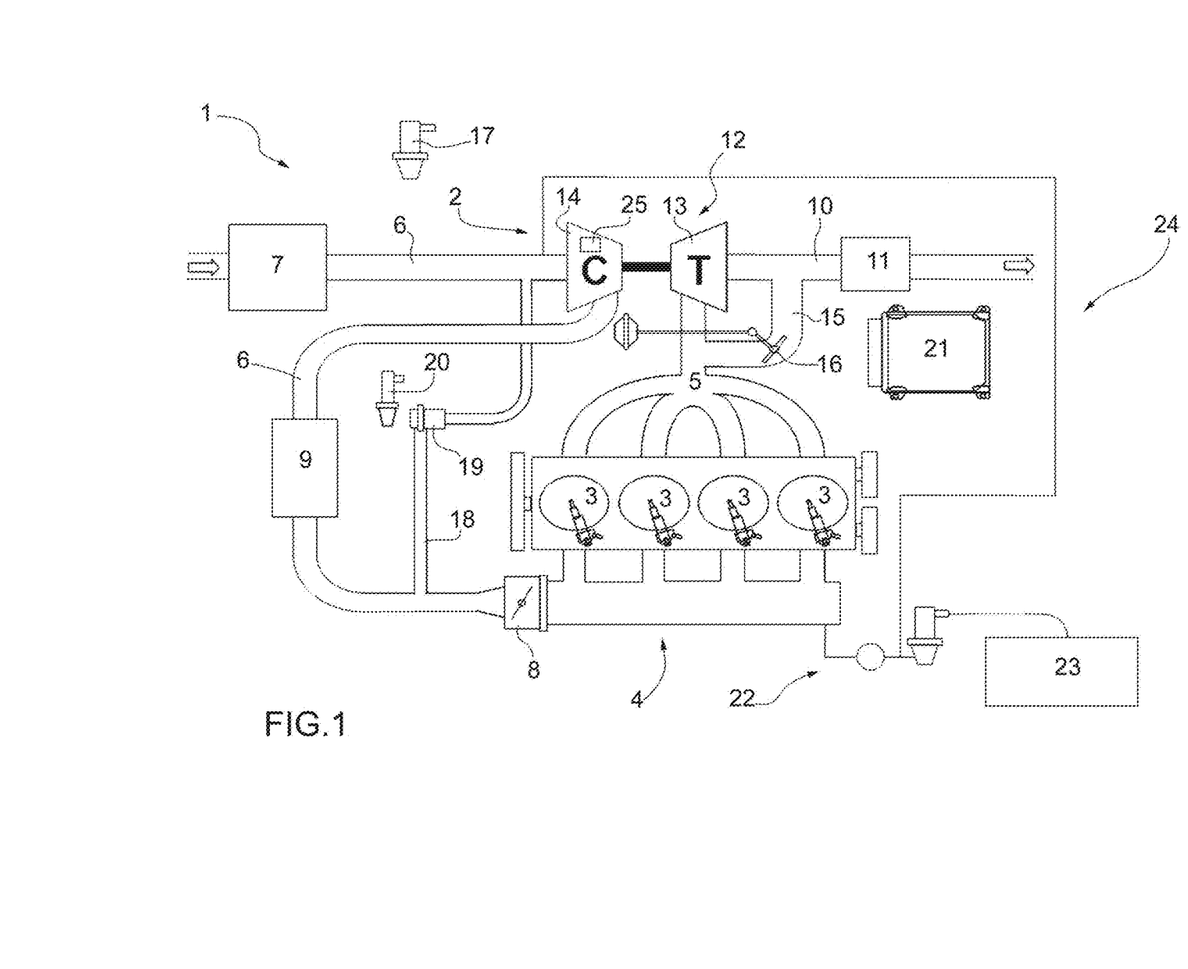
FIG. 1 is a diagrammatic view of a supercharged internal combustion engine provided with a control unit which implements the control method by means of an estimation of the average power delivered by the turbine of the turbocharger according to the present invention.

In FIG. 1, reference numeral 1 indicates as a whole an internal combustion engine which is supercharged by a supercharging system 2 having a turbocharger.

The internal combustion engine 1 comprises four cylinders 3, each of which is connected to an intake manifold 4 by means of at least one respective intake valve (not shown) and to an exhaust manifold 5 by means of at least one respective exhaust valve (not shown). The intake manifold 4 receives fresh air (i.e. air from the outside) through an intake duct 6, which is provided with an air filter 7 and is adjusted by a throttle valve 8. An intercooler 9 for cooling the air taken in is arranged along the intake duct 6. An exhaust duct 10 is connected to the exhaust manifold 5 for feeding the exhaust gases produced by the combustion to an exhaust system, which emits the gases produced by the combustion into the atmosphere and normally comprises at least one catalytic converter 11 and at least one muffler (not shown) arranged downstream of the catalytic converter 11.

The supercharging system 2 of the internal combustion engine 1 comprises a turbocharger 12 provided with a turbine 13, which is arranged along the exhaust duct 10 to rotate at high speed under the action of the exhaust gases ejected from the cylinders 3, and a compressor 14, which is arranged along the intake duct 6 and is mechanically connected to turbine 13 to be rotated by the turbine 13 itself so as to increase the pressure of the air fed into the intake duct 6.

A bypass duct 15 is provided along the exhaust duct 10 and is connected in parallel to turbine 13 so that the ends thereof are connected upstream and downstream of the turbine 13 itself; a wastage valve 16 is arranged along the bypass duct 15, is adapted to adjust the flow rate of the exhaust gases flowing through the bypass duct 15 and is controlled by an actuator 17. A bypass duct 18 is provided along the intake duct 6 and is connected in parallel to compressor 14 so that the ends thereof are connected upstream and downstream of the compressor 14 itself; a Poff valve 19 is arranged along the bypass duct 18, is adapted to adjust the flow rate of air flowing though the bypass duct 18 and is controlled by an actuator 20.

The internal combustion engine 1 is controlled by means of an electronic control unit 21 which supervises the operation of all the components of the internal combustion engine 1.

The internal combustion engine 1 further comprises a canister circuit 22 which has the function of recovering the fuel vapors which develop in a fuel tank 23 and introducing such fuel vapors into the cylinders 3 so that they are burned; thereby, the fuel vapors which develop in the fuel tank 23 are avoided from leaking from the fuel tank 23 (in particular when the fuel cap is open when filling the fuel) and freely dispersing into the atmosphere.

As shown in FIG. 1, a control system 24 is provided, which, in addition to the control unit 21, comprises at least one sensor 25 connected to the control unit 21.

Figure 2:
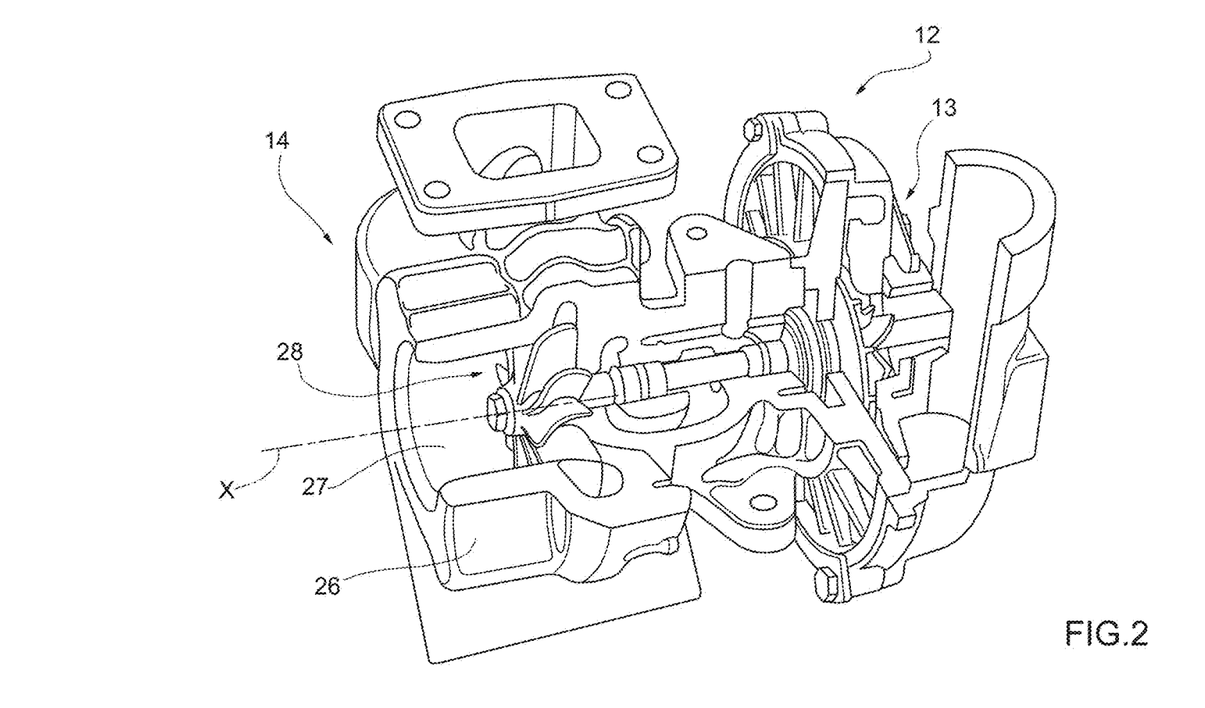
FIG. 2 is a diagrammatic view of the turbocharger of the internal combustion engine in FIG. 1.

In particular, according to a first variant, sensor 25 is an acoustic-level pressure sensor, i.e. a microphone 25, which is connected to the control unit 21 and is adapted to detect the intensity S of the sound signal which detects the movement of compressor 14. As better shown in FIG. 2, compressor 14 comprises a bladed disc rotating about a rotation axis X and a stationary diffuser 27. Microphone 25 is arranged so as to detect the intensity S of the sound signal emitted by the rotation of the blades 28. The microphone is preferably arranged in a sheltered position so as not to be excessively affected by the noise produced by horns, detonation phenomena, etc.

According to a second variant (not shown), sensor 25 is an accelerometer, which is connected to the control unit 21, is preferably installed on a volute 26 of compressor 14 and is adapted to detect the acceleration of compressor 14.

According to a further variant (not shown), the control system 24, in addition to the control unit 21, comprises both an accelerometer, which is connected to the control unit 21, is preferably installed on a volute 26 of compressor 14 and is adapted to detect the acceleration of compressor 14, and the acoustic-level pressure sensor 25, i.e. microphone 25, which is connected to the control unit 21 and is adapted to detect the intensity S of the sound signal which detects the movement of compressor 14.

The strategy of determining the instantaneous rotation speed $w_{TC}$ of turbocharger 12, implemented by means of the control unit 21 as a function of the signal acquired by sensor 25, is described below.

Figure 5:
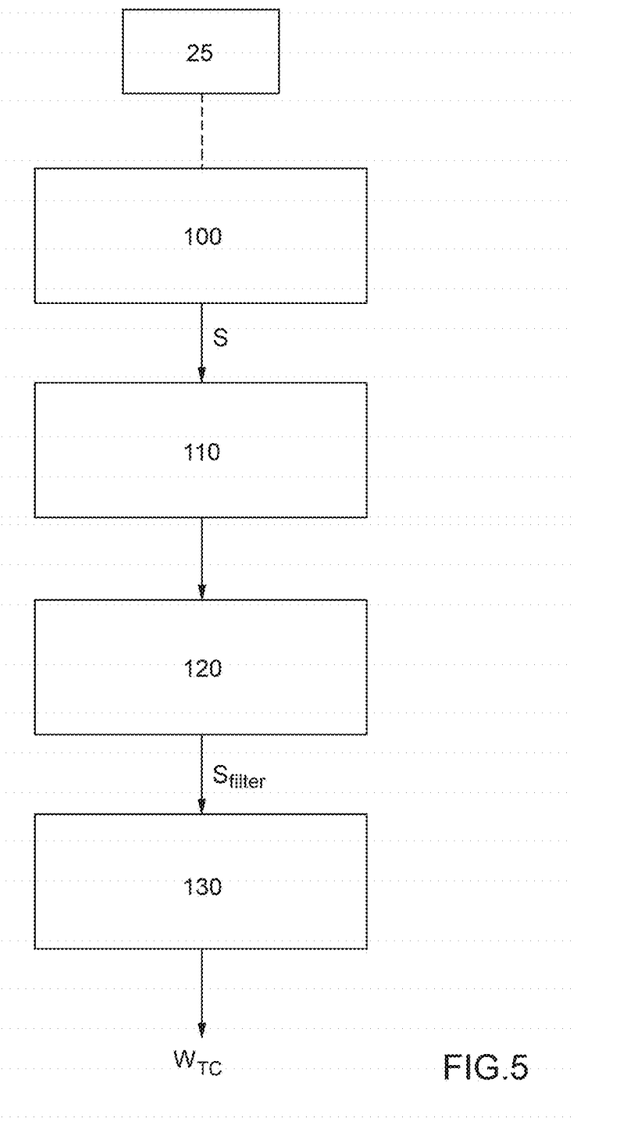
FIG. 5 shows a block diagram of the control method by means of an estimation of the average power delivered by the turbine of the turbocharger implemented in the control unit of the supercharged internal combustion engine in FIG. 1.

As shown in FIG. 5, block 100 includes the steps of acquiring, by means of sensor 25, the signal produced by the rotation of turbocharger 12. The unfiltered signal which is acquired by sensor 25 is full of information, but it may not be easily correlated to the instantaneous rotation speed $w_{TC}$ of turbocharger 12.

Figure 4:
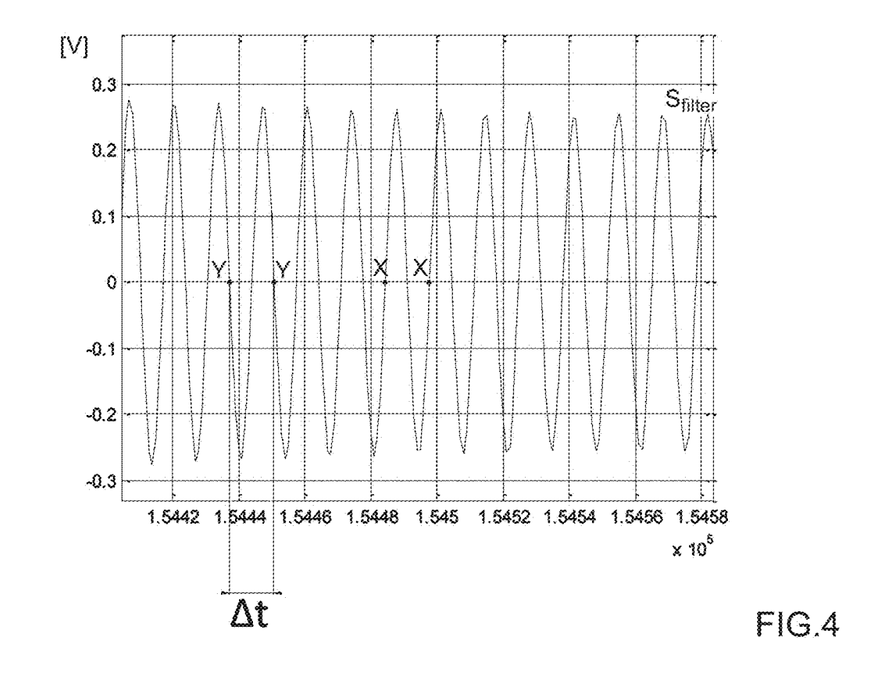
FIG. 4 shows an enlarged detail of the graph in FIG. 3.

The unfiltered signal which is acquired by sensor 25 is then transmitted and inputted to a block 110 which carries out a fast Fourier transform (FFT) of the unfiltered signal which is acquired by sensor 25, and breaks it into a sum of harmonics having different frequencies, amplitudes and phases. In FIG. 4, by way of example, a graph representing the intensity variation of the "raw" accelerometer signal acquired by sensor 25 is shown and indicated by S. In block 110, the harmonic having the highest amplitude frequency within a range of plausible frequencies for the signal generated by the rotation of the rotation shaft of turbocharger 12 is also searched.

In particular, firstly the harmonic with the maximum amplitude frequency is identified in the frequency content of the signal generated by the rotation of turbocharger 12 and acquired by sensor 25, and secondly the harmonics with the maximum amplitude frequencies are recognized to be reciprocal multiples or submultiples. In a preliminary designing and setting step, a plausible frequency range is determined, and the harmonic with the maximum amplitude frequency in the frequency content of the signal generated by the rotation of turbocharger 12 and acquired by sensor 25 is searched only within the plausible frequency range.

The average rotation speed w of turbocharger 12 is determined as a function of the harmonics with the maximum amplitude frequencies in the frequency content of the signal generated by the rotation of turbocharger 12 and acquired by sensor 25 as described in patent applications EP-2392803 and EP-2392804, incorporated herein by reference. In particular, the average rotation speed w of turbocharger 12 is calculated by using the redundant information obtainable only from the harmonics with the maximum amplitude frequencies which are reciprocal multiples or submultiples. By means of the average rotation speed w of turbocharger 12, the "frequency f of blade 28" may also be determined. In particular, the frequency f of blade 28 is a function of the number of blades 28 of compressor 14 and of the average rotation speed w of turbocharger 12.

The harmonic with the maximum amplitude frequency in the frequency content of the signal generated by the rotation of turbocharger 12 and acquired by sensor 25, representing the average rotation speed w of turbocharger 12, is transmitted and inputted to a block 120.

Within block 120, the maximum amplitude frequency in the frequency content of the signal generated by the rotation of turbocharger 12 and acquired by sensor 25 (which represents the average rotation speed w of turbocharger 12) is used to build a band-pass filter.

In particular, the band-pass filter is built by providing a quite narrow filtration about the harmonic with the maximum amplitude frequency in the frequency content of the signal generated by the rotation of turbocharger 12 and acquired by sensor 25 (which represents the average rotation speed w of turbocharger 12). The upper cutoff frequency value $w_{tH}$ and the lower cutoff frequency value $w_{tL}$ of the band-pass filter are determined as a function of the harmonic with the maximum amplitude frequency in the frequency content of the signal generated by the rotation of turbocharger 12 and acquired by sensor 25 (which represents the average rotation speed w of turbocharger 12). In other words, the upper cutoff frequency value $w_{tH}$ and the lower cutoff frequency value $w_{tL}$ of the band-pass filter can vary as a function of the harmonic with the maximum amplitude frequency in the frequency content of the signal generated by the rotation of turbocharger 12 and acquired by sensor 25.

The upper cutoff frequency value $w_{tH}$ and the lower cutoff frequency value $w_{tL}$ define a (quite narrow) frequency range, centered on the average rotation speed w of turbocharger 12, i.e. harmonic with the maximum amplitude frequency in the frequency content of the signal generated by the rotation of turbocharger 12 and acquired by sensor 25.

Figure 3:
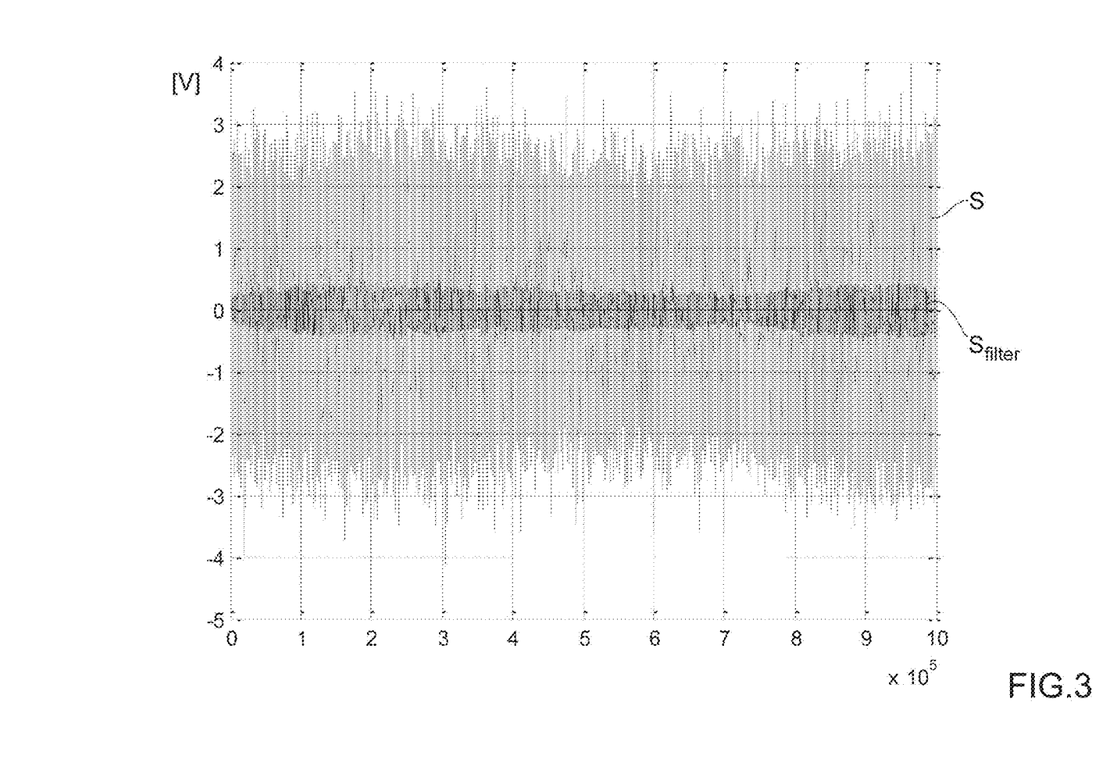
FIG. 3 is a graph showing the intensity of the signal generated by the rotation of the turbocharger and detected by a sensor in FIG. 2.

Finally, the time-based signal generated by the rotation of turbocharger 12 and acquired by sensor 25 (i.e., the "raw" accelerometer signal acquired by sensor 25 and indicated by S in FIG. 3) is filtered by means of the above-described band-pass filter.

By way of example, in FIGS. 3 and 4, the time-based signal generated by the rotation of turbocharger 12, acquired by sensor 25 and filtered by means of the band-pass filter is shown and indicated by $S_{Filter}$. The time-based signal $S_{Filter}$ generated by the rotation of turbocharger 12, acquired by sensor 25 and filtered by means of the band-pass filter is a sine wave which is then processed in a block 130 for determining the instantaneous rotation speed $w_{TC}$ of turbocharger 12.

In particular, the control unit 21 is arranged to calculate the instantaneous rotation speed $w_{TC}$ of turbocharger 12 by means of the analysis of the sine wave in a neighborhood of zero, which sine wave represents the signal $S_{Filter}$ generated by the rotation of turbocharger 12, acquired by sensor 25 and filtered by means of the band-pass filter. In particular, the method includes the steps of identifying the points at which the signal $S_{Filter}$ generated by the rotation of turbocharger 12, acquired by sensor 25 and filtered by means of the band-pass filter takes a value of zero.

Obviously, half of the points (two of which are indicated by X in FIG. 4) at which the signal $S_{Filter}$ generated by the rotation of turbocharger 12, acquired by sensor 25 and filtered by means of the band-pass filter takes a value of zero are in an ascending segment of the sine wave which represents the signal $S_{Filter}$ generated by the rotation of turbocharger 12, acquired by sensor 25 and filtered by means of the band-pass filter; while half of the points (two of which are indicated by Y in FIG. 4) at which the signal $S_{Filter}$ generated by the rotation of turbocharger 12, acquired by sensor 25 and filtered by means of the band-pass filter takes a value of zero are in a descending segment of the sine wave which represents the signal $S_{Filter}$ generated by the rotation of turbocharger 12, acquired by sensor 25 and filtered by means of the band-pass filter.

According to a preferred variant, the control unit 21 is arranged to select only the points (two of which are indicated by Y in FIG. 4) at which the signal $S_{Filter}$ generated by the rotation of turbocharger 12, acquired by sensor 25 and filtered by means of the band-pass filter takes a value of zero and are in a descending segments of the sine wave which represents the signal $S_{Filter}$ generated by the rotation of turbocharger 12, acquired by sensor 25 and filtered by means of the band-pass filter.

According to further variants, the control unit 21 is arranged to select only the points (two of which are indicated by X in FIG. 4) at which the signal $S_{Filter}$ generated by the rotation of turbocharger 12, acquired by sensor 25 and filtered by means of the band-pass filter takes a value of zero and are in the ascending segments of the sine wave which represents the signal $S_{Filter}$ generated by the rotation of turbocharger 12, acquired by sensor 25 and filtered by means of the band-pass filter; or the control unit 21 is arranged to select all the points (indicated by X and Y in FIG. 4) at which the signal $S_{Filter}$ generated by the rotation of turbocharger 12, acquired by sensor 25 and filtered by means of the band-pass filter takes a value of zero (i.e., both the points X which are in the ascending segments of the sine wave which represents the signal $S_{Filter}$ generated by the rotation of turbocharger 12, acquired by sensor 25 and filtered by means of the band-pass filter, and the points Y which are in the descending segments of the sine wave which represents the signal $S_{Filter}$ generated by the rotation of turbocharger 12, acquired by sensor 25 and filtered by means of the band-pass filter).

The time interval $\Delta t$ between two subsequent points Y at which the signal $S_{Filter}$ generated by the rotation of turbocharger 12, acquired by sensor 25 and filtered by means of the band-pass filter takes a value of zero and which are in the descending segments of the sine wave, which represents the signal $S_{Filter}$ generated by the rotation of turbocharger 12, acquired by sensor 25 and filtered by means of the band-pass filter, is then calculated.

The control unit 21 is then arranged to calculate the instantaneous rotation speed $w_{TC}$ of turbocharger 12 by means of the following formula:

$$w_{TC}[rpm] = 60/N * (1/\Delta t[s]) \quad [1]$$

$w_{TC}[rpm]$: instantaneous rotation speed of turbocharger 12 expressed in revolutions per minute;
N: number of blades of compressor 14;
$\Delta t[s]$: time interval expressed in seconds between two subsequent points Y at which the signal $S_{Filter}$ generated by the rotation of turbocharger 12, acquired by sensor 25 and filtered by means of the band-pass filter takes a value of zero and which are in the descending segments of the sine wave, which represents the signal $S_{Filter}$ generated by the rotation of turbocharger 12, acquired by sensor 25 and filtered by means of the band-pass filter.

The time interval between two subsequent points Y at which the signal $S_{Filter}$ generated by the rotation of turbocharger 12, acquired by sensor 25 and filtered by means of the band-pass filter takes a value of zero represents the period of the signal generated by the rotation of turbocharger 12 and filtered by means of the band-pass filter.

It is apparent that, when both an acoustic sensor 25, i.e. a microphone 25, and an accelerometer 25 are present, it is possible to determine both the instantaneous rotation speed $w_{TC\_microphone}$ of turbocharger 12 using the sound signal generated by the rotation of turbocharger 12 and detected by means of microphone 25, and the instantaneous rotation speed $w_{TC\_accelerometer}$ of turbocharger 12 using the signal generated by the rotation of turbocharger 12 and detected by means of accelerometer 25. The two instantaneous rotation speed values $w_{TC\_microphone}$, $w_{TC\_accelerometer}$ of turbocharger 12 are then compared with each other and, if the absolute value difference between the instantaneous rotation speed $w_{TC\_microphone}$ of turbocharger 12 using the sound signal generated by the rotation of turbocharger 12 and detected by means of microphone 25, and the instantaneous rotation speed $w_{TC\_accelerometer}$ of turbocharger 12 using the signal generated by the rotation of turbocharger 12 and detected by means of accelerometer 25 exceeds a tolerance limit value (usually determined in a preliminary designing and setting step), a fault of at least one of the sensors 25 (i.e., of microphone 25 or accelerometer 25) is diagnosed.

The strategy of determining the average value $\overline{P}_T$ of the power delivered by turbine 13 implemented by means of the control unit 21 as a function of the instantaneous rotation speed $w_{TC}$ of turbocharger 12 is described below.

Once the instantaneous rotation speed $w_{TC}$ of turbocharger 12 has been determined, the power balance of turbocharger 12 may be expressed by means of the following formula:

$$(P_T - P_C) * \eta_0 = J_{TC} * w_{TC} * \dot{w}_{TC} \quad [2]$$

$w_{TC}$: instantaneous rotation speed of turbocharger 12 expressed in revolutions per minute;
$\dot{w}_{TC}$: angular acceleration of turbocharger 12;
$P_T$: power delivered by turbine 13;
$P_C$: power absorbed by compressor 14;
$\eta_0$: organic efficiency of turbocharger 12;
$J_{TC}$: inertia of the assembly consisting of turbine 13 and compressor 14 when subjected to rotation.

The power balance of turbocharger 12 expressed in formula [2] may also be expressed in the Fourier domain by means of the following formula:

$$(\overline{P}_T - \overline{P}_C) * \eta_0 = J_{TC} * \overline{w}_{TC} * \overline{\dot{w}}_{TC} \quad [3]$$

$\overline{w}_{TC}$: average value of the instantaneous rotation speed of turbocharger 12 expressed in revolutions per minute;
$\overline{\dot{w}}_{TC}$: average value of the angular acceleration of turbocharger 12;
$\overline{P}_T$: average value of the power delivered by turbine 13;
$\overline{P}_C$: average value of the power absorbed by compressor 14;
$\eta_0$: organic efficiency of turbocharger 12; and
$J_{TC}$: inertia of the assembly consisting of turbine 13 and compressor 14 when subjected to rotation.

It was experimentally verified that the power balance of turbocharger 12 expressed in formula [2] may be simplified, considering that only the power delivered by turbine 13 has a significant energy contribution at the j-th harmonic which characterizes the combustion process, while the energy contribution of the power absorbed by compressor 14 at the j-th harmonic which characterizes the supercharged internal combustion engine 1 is negligible. The j-th harmonic which characterizes the combustion process is equal to the number of cylinders 3 for an engine with equally spaced combustions.

The power balance of turbocharger 12 expressed in formula [3] may thus be simplified as follows:

$$P_{Tj} * \eta_0 = J_{TC} * \overline{w}_{TC} * \dot{w}_{TCj} \qquad [4]$$

$\overline{w}_{TC}$: average value of the instantaneous rotation speed of turbocharger 12 expressed in revolutions per minute;

$\dot{w}_{TCj}$: j-th harmonic component of the angular acceleration of turbocharger 12;

$P_{Tj}$: j-th harmonic component which characterizes the supercharged internal combustion engine 1;

$\overline{P}_C$: average value of the power absorbed by compressor 14;

$\eta_0$: organic efficiency of turbocharger 12;

$J_{TC}$: inertia of the assembly consisting of turbine 13 and compressor 14 when subjected to rotation.

The correlation between the j-th harmonic component $P_{Tj}$ which characterizes the supercharged internal combustion engine 1 and the average value $\overline{P}_T$ of the power delivered by turbine 13 may also be determined by means of the following formula:

$$P_{Tj} = \alpha * \overline{P}_T \qquad [5]$$

$P_{Tj}$: j-th harmonic component of the average value of the power delivered by turbine 13;

$\overline{P}_T$: average value of the power delivered by turbine 13;

$\alpha$: correlation/proportionality coefficient linking the j-th harmonic component $P_{Tj}$ of the average value of the power delivered by turbine 13 and the average value $\overline{P}_T$ of the power delivered by turbine 13.

Moreover, it was experimentally verified that the following relationship may be established:

$$\overline{w}_{TC} * \dot{w}_{TCj} = |w_{TCj}| * w_{eng} * w_{TC} \qquad [6]$$

$\overline{w}_{TC}$: average value of the instantaneous rotation speed of turbocharger 12 expressed in revolutions per minute;

$\dot{w}_{TCj}$: j-th harmonic component of the angular acceleration of turbocharger 12, which characterizes the supercharged internal combustion engine 1;

$|w_{TCj}|$: modulus of the j-th harmonic component of the instantaneous rotation speed of turbocharger 12, which characterizes the supercharged internal combustion engine 1;

$w_{eng}$: engine speed in revolutions per minute;

$w_{TC}$: instantaneous rotation speed of turbocharger 12 expressed in revolutions per minute.

Therefore, by substituting equations [5] and [6] in equation [4]:

$$\alpha * \eta_0 * \overline{P}_T = J_{TC} * |w_{TCj}| * w_{eng} * w_{TC} \qquad [7]$$

$\overline{P}_T$: average value of the power delivered by turbine 13;

$\alpha$: correlation/proportionality coefficient linking the j-th harmonic component $P_{Tj}$ which characterizes the supercharged internal combustion engine 1 and the average value $\overline{P}_T$ of the power delivered by turbine 13;

$\eta_0$: organic efficiency of turbocharger 12;

$J_{TC}$: inertia of the assembly consisting of turbine 13 and compressor 14 when subjected to rotation;

$|w_{TCj}|$: modulus of the j-th harmonic component of the instantaneous rotation speed of turbocharger 12, which characterizes the supercharged internal combustion engine 1;

$w_{eng}$: engine speed in revolutions per minute;

$w_{TC}$: instantaneous rotation speed of turbocharger 12 expressed in revolutions per minute.

Equation [7] may be simplified as follows:

$$\frac{\overline{P}_T}{w_{eng}} = \frac{J_{TC}}{\alpha * \eta_0} * |w_{TCj}| * w_{TC} \qquad [8]$$

$\overline{P}_T$: average value of the power delivered by turbine 13 (and normalized with respect to the engine speed $w_{eng}$ in engine revolutions);

$\alpha$: correlation/proportionality coefficient linking the j-th harmonic component $P_{Tj}$ which characterizes the supercharged internal combustion engine 1 and the average value $\overline{P}_T$ of the power delivered by turbine 13;

$\eta_0$: organic efficiency of turbocharger 12;

$J_{TC}$: inertia of the assembly consisting of turbine 13 and compressor 14 when subjected to rotation;

$|w_{TCj}|$: modulus of the j-th harmonic component of the instantaneous rotation speed of turbocharger 12, which characterizes the supercharged internal combustion engine 1;

$w_{eng}$: engine speed in revolutions per minute;

$w_{TC}$: instantaneous rotation speed of turbocharger 12 expressed in revolutions per minute.

Therefore, a proportionality constant may be defined between the average value $\overline{P}_T$ of the power delivered by turbine 13, the instantaneous rotation speed $w_{TC}$ of turbocharger 12 expressed in revolutions per minute, and the modulus $|w_{TCj}|$ of the j-th harmonic component of the instantaneous rotation speed of turbocharger 12, which characterizes the supercharged internal combustion engine 1, according to the following equation:

$$K = \frac{J_{TC}}{\alpha * \eta_0} \qquad [9]$$

K: proportionality constant between the average value $\overline{P}_T$ of the power delivered by turbine 13 normalized with respect to the engine speed value, the instantaneous rotation speed $w_{TC}$ of turbocharger 12 expressed in revolutions per minute, and the modulus $|w_{TCj}|$ of the j-th harmonic component of the instantaneous rotation speed of turbocharger 12, which characterizes the supercharged internal combustion engine 1;

$\alpha$: correlation/proportionality coefficient linking the j-th harmonic component $P_{Tj}$ of the average value of the power delivered by turbine 13 and the average value $\overline{P}_T$ of the power delivered by turbine 13;

$\eta_0$: organic efficiency of turbocharger 12;

$J_{TC}$: inertia of the assembly consisting of turbine 13 and compressor 14 when subjected to rotation.

By substituting equation [9] in equation [8]:

$$\frac{\overline{P}_T}{w_{eng}} = K * |w_{TCj}| * w_{TC} \qquad [10]$$

K: proportionality constant between the average value $\overline{P}_T$ of the power delivered by turbine 13 normalized with respect to the engine speed value, the instantaneous rotation speed $w_{TC}$ of turbocharger 12 expressed in revolutions per minute, and the modulus $|w_{TCj}|$ of the j-th harmonic component of the instantaneous rotation speed of turbocharger 12, which characterizes the supercharged internal combustion engine 1;

$\overline{P}_T$: average value of the power delivered by turbine 13;

$|w_{TCj}|$: modulus of the j-th harmonic component of the instantaneous rotation speed of turbocharger 12, which characterizes the supercharged internal combustion engine 1;

$w_{eng}$: engine speed in revolutions per minute; and $w_{TC}$: instantaneous rotation speed of turbocharger 12 expressed in revolutions per minute.

Once the average value $\overline{P}_T$ of the power delivered by turbine 13 has been determined and as a function of the layout of the internal combustion engine 1, the control unit 21 is arranged to use such an average value $\overline{P}_T$ of the power delivered by turbine 13 in order to determine further characteristic magnitudes.

For example, the average value $\overline{P}_T$ of the power delivered by turbine 13 is expressed by means of the following known formula:

$$\overline{P}_T = \dot{m} * \eta_T * T_3 * \left(1 - \left(\frac{p_4}{p_3}\right)^{\frac{\gamma-1}{\gamma}}\right) \quad [11]$$

$\overline{P}_T$: average value of the power delivered by turbine 13;

$\dot{m}$: flow rate of the exhaust gases flowing through turbine 13;

$\eta_T$: internal efficiency of turbine 13;

$p_3$: pressure upstream of turbine 13;

$p_4$: pressure downstream of turbine 13;

$T_3$: temperature upstream of turbine 13; and $\gamma$: specific heat of the exhaust gases flowing through turbine 13.

If the value $p_3$ of the pressure upstream of turbine 13, the value $p_4$ of the pressure downstream of turbine 13, the gas flow rate $\dot{m}$ flowing through turbine 13, the internal efficiency $\eta_T$ of turbine 13, and the specific heat $\gamma$ of the exhaust gases flowing through turbine 13 are known (since detected by means of specific sensors or estimated inside the control unit 21 or even because provided by the manufacturer of turbine 13), the temperature $T_3$ upstream of turbine 13 may be determined by means of the following formula:

$$T_3 = \frac{\overline{P}_T}{\dot{m} * \eta_T * \left(1 - \left(\frac{p_4}{p_3}\right)^{\frac{\gamma-1}{\gamma}}\right)} \quad [12]$$

$\overline{P}_T$: average value of the power delivered by turbine 13;

$\dot{m}$: gas flow rate flowing through turbine 13;

$\eta_T$: internal efficiency of turbine 13;

$p_3$: pressure upstream of turbine 13;

$p_4$: pressure downstream of turbine 13;

$T_3$: temperature upstream of turbine 13; and $\gamma$: specific heat of the exhaust gases flowing through turbine 13.

Similarly, if the value $T_3$ of the temperature upstream of turbine 13, the value $p_4$ of the pressure downstream of turbine 13, the gas flow rate $\dot{m}$ flowing through turbine 13, the internal efficiency $\eta_T$ of turbine 13, and the specific heat $\gamma$ of the exhaust gases flowing through turbine 13 are known (since detected by means of specific sensors or estimated inside the control unit 21 or even because provided by the manufacturer of turbine 13), the value $p_3$ of the pressure upstream of turbine 13 may be determined by means of the following formula:

$$p_3 = \frac{p_4}{\sqrt[\frac{\gamma-1}{\gamma}]{1 - \frac{\overline{P}_T}{\dot{m} * \eta_T * T_3}}} \quad [13]$$

$\overline{P}_T$: average value of the power delivered by turbine 13;

$\dot{m}$: gas flow rate flowing through turbine 13;

$\eta_T$: internal efficiency of turbine 13;

$p_3$: pressure upstream of turbine 13;

$p_4$: pressure downstream of turbine 13;

$T_3$: temperature upstream of turbine 13; and $\gamma$: specific heat of the exhaust gases flowing through turbine 13.

As a further example, the average value $\overline{P}_T$ of the power delivered by turbine 13 is expressed by means of the following known formula:

$$\overline{P}_T = \dot{m} * \eta_T * T_4 * \left(\left(\frac{p_3}{p_4}\right)^{\frac{\gamma-1}{\gamma}} - 1\right) \quad [14]$$

$\overline{P}_T$: average value of the power delivered by turbine 13;

$\dot{m}$: gas flow rate flowing through turbine 13;

$\eta_T$: internal efficiency of turbine 13;

$p_3$: pressure upstream of turbine 13;

$p_4$: pressure downstream of turbine 13;

$T_4$: temperature downstream of turbine 13; and $\gamma$: specific heat of the exhaust gases flowing through turbine 13.

If the value $p_3$ of the pressure upstream of turbine 13, the value $p_4$ of the pressure downstream of turbine 13, the gas flow rate $\dot{m}$ flowing through turbine 13, the internal efficiency $\eta_T$ of turbine 13, and the specific heat $\gamma$ of the exhaust gases flowing through turbine 13 are known (since detected by means of specific sensors or estimated inside the control unit 21 or even because provided by the manufacturer of turbine 13), the temperature $T_4$ downstream of turbine 13 may be determined by means of the following formula:

$$T_4 = \frac{\overline{P}_T}{\dot{m} * \eta_T * \left(\left(\frac{p_3}{p_4}\right)^{\frac{\gamma-1}{\gamma}} - 1\right)} \quad [15]$$

$\overline{P}_T$: average value of the power delivered by turbine 13;

$\dot{m}$: gas flow rate flowing through turbine 13;

$\eta_T$: internal efficiency of turbine 13;

$p_3$: pressure upstream of turbine 13;

$p_4$: pressure downstream of turbine 13;

$T_4$: temperature downstream of turbine 13; and $\gamma$: specific heat of the exhaust gases flowing through turbine 13.

Similarly, if the value $T_4$ of the temperature downstream of turbine 13, the value $p_3$ of the pressure upstream of turbine 13, the gas flow rate $\dot{m}$ flowing through turbine 13, the internal efficiency $\eta_T$ of turbine 13, and the specific heat $\gamma$ of the exhaust gases flowing through turbine 13 are known (since detected by means of specific sensors or estimated inside the control unit 21 or even because provided by the manufacturer of turbine 13), the value $p_4$ of the pressure downstream of turbine 13 may be determined by means of the following formula:

$$p_4 = \frac{p_3}{\sqrt[\frac{\gamma-1}{\gamma}]{1 + \sqrt{\frac{\overline{P}_T}{\dot{m} * \eta_T * T_4}}}} \quad [16]$$

$\overline{P}_T$: average value of the power delivered by turbine 13;
$\dot{m}$: gas flow rate flowing through turbine 13;
$\eta_T$: internal efficiency of turbine 13;
$p_3$: pressure upstream of turbine 13;
$p_4$: pressure downstream of turbine 13;
$T_4$: temperature downstream of turbine 13; and
$\gamma$: specific heat of the exhaust gases flowing through turbine 13.

As a further example, the average value $\overline{P}_C$ of the power delivered by compressor 14 is calculated by means of the following formula:

$$\overline{P}_C = \frac{1}{\eta_C} * \eta_0 * \overline{P}_T \quad [17]$$

$\overline{P}_T$: average value of the power delivered by turbine 13;
$\overline{P}_C$: average value of the power delivered by compressor 14;
$\eta_c$: internal efficiency of compressor 14; and
$\eta_0$: organic efficiency of turbocharger 12.

Once the average value $\overline{P}_C$ of the power delivered by compressor 14 has been determined, formulas [12], [13], [15] and [16] may be used as discussed above for determining the value of pressure upstream of compressor 14, the value of pressure downstream of compressor 14, the value of temperature upstream of compressor 14, and the value of temperature downstream of compressor 14.

For example, the average value $\overline{P}_C$ of the power delivered by compressor 14 is expressed by means of the following known formula:

$$\overline{P}_C = \dot{m} * \eta_C * T_1 * \left(\left(\frac{p_2}{p_1}\right)^{\frac{\gamma-1}{\gamma}} - 1\right) \quad [18]$$

$\overline{P}_c$: average value of the power delivered by compressor 14;
$\dot{m}$: flow rate of the gas mixture (air and possible recirculated exhaust gases) flowing through compressor 14;
$\eta_C$: internal efficiency of compressor 14;
$p_1$: pressure upstream of compressor 14;
$p_2$: pressure downstream of compressor 14;
$T_1$: temperature upstream of compressor 14; and
$\gamma$: specific heat of the gas mixture (air and possible recirculated exhaust gases) flowing through compressor 14.

If the value $p_1$ of the pressure upstream of compressor 14, the value $p_2$ of the pressure downstream of compressor 14, the flow rate $\dot{m}$ of the gas mixture (air and possible recirculated exhaust gases) flowing through compressor 14, the internal efficiency $\eta_C$ of compressor 14, and the specific heat $\gamma$ of the gas mixture (air and possible recirculated exhaust gases) flowing through compressor 14 are known (since detected by means of specific sensors or estimated inside the control unit 21 or even because provided by the manufacturer of compressor 14), the temperature $T_1$ upstream of compressor 14 may be determined by means of the following formula:

$$T_1 = \frac{\overline{P}_C}{\dot{m} * \eta_C * \left(\left(\frac{p_2}{p_1}\right)^{\frac{\gamma-1}{\gamma}} - 1\right)} \quad [19]$$

$\overline{P}_C$: average value of the power delivered by compressor 14;
$\dot{m}$: flow rate of the gas mixture (air and possible recirculated exhaust gases) flowing through compressor 14;
$\eta_C$: internal efficiency of compressor 14;
$p_1$: pressure upstream of compressor 14;
$p_2$: pressure downstream of compressor 14;
$T_1$: temperature upstream of compressor 14; and
$\gamma$: specific heat of the gas mixture (air and possible recirculated exhaust gases) flowing through compressor 14.

Similarly, if the temperature $T_1$ upstream of compressor 14, the value $p_2$ of the pressure downstream of compressor 14, the flow rate $\dot{m}$ of the gas mixture (air and possible recirculated exhaust gases) flowing through compressor 14, the internal efficiency $\eta_C$ of compressor 14, and the specific heat $\gamma$ of the gas mixture (air and possible recirculated exhaust gases) flowing through compressor 14 are known (since detected by means of specific sensors or estimated inside the control unit 21 or even because provided by the manufacturer of compressor 14), the pressure $p_1$ upstream of compressor 14 may be determined by means of the following formula:

$$p_1 = \frac{p_2}{\sqrt[\frac{\gamma-1}{\gamma}]{1 + \frac{\overline{P}_C}{\dot{m} * \eta_C * T_1}}} \quad [20]$$

$\overline{P}_C$: average value of the power delivered by compressor 14;
$\dot{m}$: flow rate of the gas mixture (air and possible recirculated exhaust gases) flowing through compressor 14;
$\eta_C$: internal efficiency of compressor 14;
$p_1$: pressure upstream of compressor 14;
$p_2$: pressure downstream of compressor 14;
$T_1$: temperature upstream of compressor 14; and
$\gamma$: specific heat of the gas mixture (air and possible recirculated exhaust gases) flowing through compressor 14.

As a further example, the average value $\overline{P}_C$ of the power delivered by compressor 14 is expressed by means of the following known formula:

$$\overline{P}_C = \dot{m} * \eta_C * T_2 * \left(1 - \frac{1}{\left(\frac{p_2}{p_1}\right)^{\frac{\gamma-1}{\gamma}}}\right) \quad [21]$$

$\overline{P}_C$: average value of the power delivered by compressor 14;
$\dot{m}$: flow rate of the gas mixture (air and possible recirculated exhaust gases) flowing through compressor 14;
$\eta_C$: internal efficiency of compressor 14;
$p_1$: pressure upstream of compressor 14;
$p_2$: pressure downstream of compressor 14;
$T_2$: temperature downstream of compressor 14; and γ: specific heat of the gas mixture (air and possible recirculated exhaust gases) flowing through compressor 14.

If the value $p_1$ of the pressure upstream of compressor 14, the value $p_2$ of the pressure downstream of compressor 14, the flow rate ṁ of the gas mixture (air and possible recirculated exhaust gases) flowing through compressor 14, the internal efficiency $\eta_C$ of compressor 14, and the specific heat γ of the gas mixture (air and possible recirculated exhaust gases) flowing through compressor 14 are known (since detected by means of specific sensors or estimated inside the control unit 21 or even because provided by the manufacturer of compressor 14), the temperature $T_2$ downstream of compressor 14 may be determined by means of the following formula:

$$T_2 = \frac{\overline{P}_C}{\dot{m} * \eta_C * \left(1 - 1 \Big/ \left(\frac{p_2}{p_1}\right)^{\frac{\gamma-1}{\gamma}}\right)} \quad [22]$$

$\overline{P}_C$: average value of the power delivered by compressor 14;
ṁ: flow rate of the gas mixture (air and possible recirculated exhaust gases) flowing through compressor 14;
$\eta_C$: internal efficiency of compressor 14;
$p_1$: pressure upstream of compressor 14;
$p_2$: pressure downstream of compressor 14;
$T_2$: temperature downstream of compressor 14; and
γ: specific heat of the gas mixture (air and possible recirculated exhaust gases) flowing through compressor 14.

Similarly, if the temperature $T_2$ downstream of compressor 14, the value $p_1$ of the pressure upstream of compressor 14, the flow rate ṁ of the gas mixture (air and possible recirculated exhaust gases) flowing through compressor 14, the internal efficiency $\eta_C$ of compressor 14, and the specific heat γ of the gas mixture (air and possible recirculated exhaust gases) flowing through compressor 14 are known (since detected by means of specific sensors or estimated inside the control unit 21 or even because provided by the manufacturer of compressor 14), the value $p_2$ of the pressure downstream of compressor 14 may be determined by means of the following formula:

$$p_2 = \frac{p_1}{\sqrt[\frac{\gamma-1}{\gamma}]{1 - \frac{\overline{P}_C}{\dot{m} * \eta_C * T_2}}} \quad [23]$$

$\overline{P}_C$: average value of the power delivered by compressor 14;
ṁ: flow rate of the gas mixture (air and possible recirculated exhaust gases) flowing through compressor 14;
$\eta_C$: internal efficiency of compressor 14;
$p_1$: pressure upstream of compressor 14;
$p_2$: pressure downstream of compressor 14;
$T_2$: temperature downstream of compressor 14; and
γ: specific heat of the gas mixture (air and possible recirculated exhaust gases) flowing through compressor 14.

On the other hand, if the value $p_3$ of the pressure upstream of turbine 13, the value $T_3$ of the temperature upstream of turbine 13, the value $p_4$ of the pressure downstream of turbine 13, the internal efficiency $\eta_T$ of turbine 13, and the specific heat γ of the exhaust gases flowing through turbine 13 are known (since detected by means of specific sensors or estimated inside the control unit 21 or even because provided by the manufacturer of turbine 13), the gas flow rate ṁ flowing through turbine 13 may be determined by means of the following formula:

$$\dot{m} = \frac{\overline{P}_T}{T_3 * \eta_T * \left(1 - \left(\frac{p_4}{p_3}\right)^{\frac{\gamma-1}{\gamma}}\right)} \quad [24]$$

$\overline{P}_T$: average value of the power delivered by turbine 13;
ṁ: flow rate of the gases flowing through turbine 13;
$\eta_T$: internal efficiency of turbine 13;
$p_3$: pressure upstream of turbine 13;
$p_4$: pressure downstream of turbine 13;
$T_3$: temperature upstream of turbine 13; and
γ: specific heat of the exhaust gases flowing through the turbine 13.

Alternatively, if the value $p_3$ of the pressure upstream of turbine 13, the value $T_4$ of the temperature downstream of turbine 13, the value $p_4$ of the pressure downstream of turbine 13, the internal efficiency $\eta_T$ of turbine 13, and the specific heat γ of the exhaust gases flowing through turbine 13 are known (since detected by means of specific sensors or estimated inside the control unit 21 or even because provided by the manufacturer of turbine 13), the gas flow rate ṁ flowing through turbine 13 may be determined by means of the following formula:

$$\dot{m} = \frac{\overline{P}_T}{T_4 * \eta_T * \left(\left(\frac{p_3}{p_4}\right)^{\frac{\gamma-1}{\gamma}} - 1\right)} \quad [25]$$

$\overline{P}_T$: average value of the power delivered by turbine 13;
ṁ: flow rate of the gases flowing through turbine 13;
$\eta_T$: internal efficiency of turbine 13;
$p_3$: pressure upstream of turbine 13;
$p_4$: pressure downstream of turbine 13;
$T_4$: temperature downstream of turbine 13; and
γ: specific heat of the exhaust gases flowing through the turbine 13.

Similarly, if the temperature $T_2$ downstream of compressor 14, the value $p_1$ of the pressure upstream of compressor 14, the value $p_2$ of the pressure downstream of compressor 14, the internal efficiency $\eta_C$ of compressor 14, and the specific heat γ of the gas mixture (air and possible recirculated exhaust gases) flowing through compressor 14 are known (since detected by means of specific sensors or estimated inside the control unit 21 or even because provided by the manufacturer of compressor 14), the flow rate ṁ of the gas mixture (air and possible recirculated exhaust gases) flowing through compressor 14 may be determined by means of the following formula:

$$\dot{m} = \frac{\overline{P}_C}{T_2 * \eta_C * \left(1 - 1 \Big/ \left(\frac{p_2}{p_1}\right)^{\frac{\gamma-1}{\gamma}}\right)} \quad [26]$$

$\overline{P}_C$: average value of the power delivered by compressor 14;
ṁ: flow rate of the gas mixture (air and possible recirculated exhaust gases) flowing through compressor 14;
$\eta_C$: internal efficiency of compressor 14;
$p_1$: pressure upstream of compressor 14;

p₂: pressure downstream of compressor 14;

T₂: temperature downstream of compressor 14; and

γ: specific heat of the gas mixture (air and possible recirculated exhaust gases) flowing through compressor 14.

Alternatively, if the temperature T₁ upstream of compressor 14, the value p₁ of the pressure upstream of compressor 14, the value p₂ of the pressure downstream of compressor 14, the internal efficiency $\eta_C$ of compressor 14, and the specific heat γ of the gas mixture (air and possible recirculated exhaust gases) flowing through compressor 14 are known (since detected by means of specific sensors or estimated inside the control unit 21 or even because provided by the manufacturer of compressor 14), the flow rate ṁ of the gas mixture (air and possible recirculated exhaust gases) flowing through compressor 14 may be determined by means of the following formula:

$$\dot{m} = \frac{\overline{P_C}}{T_1 * \eta_C * \left(\left(\frac{p_2}{p_1}\right)^{\frac{\gamma-1}{\gamma}} - 1\right)} \quad [27]$$

$\overline{P_C}$: average value of the power delivered by compressor 14;

ṁ: flow rate of the gas mixture (air and possible recirculated exhaust gases) flowing through compressor 14;

$\eta_C$: internal efficiency of compressor 14;

p₁: pressure upstream of compressor 14;

p₂: pressure downstream of compressor 14;

T₁: temperature upstream of compressor 14; and

γ: specific heat of the gas mixture (air and possible recirculated exhaust gases) flowing through compressor 14.

Moreover, according to a preferred variant, the internal combustion engine 1 is provided with a pumping member which is capable of adjusting the quantity of lubricating fluid to be circulated, such as for example an electronically actuated pump or a variable geometry pump. The control unit 21 is configured to control the pumping member so that the circulated quantity of control fluid is variable as a function of the average value $\overline{P_T}$ of the power delivered by turbine 13. In particular, the control unit 21 is configured to control the pumping member so that the circulated control fluid is higher for high average values $\overline{P_T}$ of the power delivered by turbine 13 (i.e., an increased lubrication for high average values $\overline{P_T}$ of the power delivered by turbine 13) and so that the circulated control fluid is lower for low average values $\overline{P_T}$ of the power delivered by the turbine (i.e., a decreased lubrication for low average values $\overline{P_T}$ of the power delivered by the turbine).

It is apparent that the aforesaid determination of the average value $\overline{P_T}$ of the power delivered by turbine 13 may be carried out within the control unit 21 either by using the instantaneous rotation speed $w_{TC}$ of turbocharger 12 expressed in revolutions per minute, obtained as a function of the signal acquired by sensor 25 (a microphone or an accelerometer) and calculated by means of formula [1] in the above discussion, or by using a sensor (preferably a Hall effect or eddy current sensor) which detects the passage of the blades 28 of compressor 14 and determines the instantaneous rotation speed $w_{TC}$ of the turbocharger 12 itself as a function of the frequency of passage of the blades 28 and is fixed to a wall of the diffuser 27 of compressor 14 in a position facing and close to the blades 28.

Alternatively, the supercharged internal combustion engine 1 may be provided with both sensor 25 (a microphone or an accelerometer) and the further sensor which detects the passage of the blades 28 of compressor 14 and determines the instantaneous rotation speed $w_{TC}$ of the turbocharger 12 itself as a function of the frequency of passage of the blades 28. Here, the two values of the instantaneous rotation speed $w_{TC}$ of turbocharger 12, expressed in revolutions per minute and obtained by means of formula [1] through the signal from sensor 25 and from the further sensor which detects the passage of the blades 28 of compressor 14, respectively, are compared with each other. If the absolute value difference between the two values obtained for the instantaneous rotation speed $w_{TC}$ of turbocharger 12 exceeds a safe value (determined in a preliminary designing and setting step), a fault of one of the sensors used for determining the instantaneous rotation speed $w_{TC}$ of turbocharger 12 is diagnosed.

The above-described strategies may advantageously be used by the control unit 21 for highly accurately estimating both the instantaneous rotation speed $w_{TC}$ of turbocharger 12 and the average value $\overline{P_T}$ of the power delivered by the turbine 13 of turbocharger 12; such estimations of the instantaneous rotation speed $w_{TC}$ of turbocharger 12 and of the average value $\overline{P_T}$ of the power delivered by the turbine 13 of turbocharger 12 are useful for obtaining a plurality of information (such as for example the value of pressure upstream/downstream of compressor 14/turbine 13, the value of temperature upstream/downstream of compressor 14/turbine 13, or the exhaust gas flow rate ṁ flowing through turbine 13) which allow to manage supercharger 12 efficiently and which allow to optimize the lubrication and conditioning of turbocharger 12, as well as the performance and consumptions of the turbocharger 12 itself. It was experimentally verified that the above-discussed strategies used by the control unit 21 for estimating both the instantaneous rotation speed $w_{TC}$ of turbocharger 12 and the average value $\overline{P_T}$ of the power delivered by the turbine 13 of turbocharger 12 provide for a highly accurate estimation while greatly reducing the computational load of the control unit 21, thus allowing to also reduce the response time of the control unit 21 for the estimation of the instantaneous rotation speed $w_{TC}$ of turbocharger 12 and of the average value $\overline{P_T}$ of the power delivered by the turbine 13 of turbocharger 12.

The invention claimed is:

1. A method to control a supercharged internal combustion engine (1) by means of a turbocharger (12) provided with a turbine (13) and a compressor (14) which compresses the air taken in and comprising a number of cylinders (3); the control method comprises the steps of:

determining the instantaneous rotation speed ($w_{TC}$) of the turbocharger (12); and calculating the average power ($\overline{P_T}$) delivered by the turbine (13) by means of the following formula:

$$\frac{\overline{P_T}}{w_{eng}} = K * |w_{TCj}| * w_{TC} \quad [10]$$

K: proportionality constant, calculated by means of the relationship of the inertia (J) of the assembly consisting of the turbine (13) and the compressor (14) when subjected to rotation with the product of the organic efficiency ($\eta_O$) of the turbocharger (12) and the proportionality coefficient (α) linking the j-th harmonic component ($\overline{P_{Tj}}$) of the average power ($\overline{P_T}$) delivered by the turbine (13) and the average power ($\overline{P_T}$) delivered by the turbine (13);

$\overline{P_T}$: average power delivered by the turbine (13);

$|w_{TCj}|$: absolute value of the j-th harmonic component of the instantaneous rotation speed ($w_{TC}$) of the turbocharger (12); wherein, the j-th harmonic component of the instantaneous rotation speed ($w_{TC}$) of the turbocharger (12) is equal to the number of cylinders (3) for a supercharged internal combustion engine (1) with equally spaced combustions;

$w_{eng}$: speed of the supercharged internal combustion engine (1); and $w_{TC}$: instantaneous rotation speed of the turbocharger (12); and controlling the supercharged internal combustion engine (1) as a function of the average power ($\overline{P}_T$) delivered by the turbine (13).

2. A method according to claim 1, wherein the step of determining the instantaneous rotation speed ($w_{TC}$) of the turbocharger (12) comprises the sub-steps of:

detecting, by means of a sensor (25), in particular by means of a microphone (25) or an accelerometer (25), the intensity of a signal generated by the rotation of the turbocharger (12);

determining a frequency content of the signal generated by the rotation of the turbocharger (12) detected by the sensor (25);

determining the average rotation speed (w) of the turbocharger (12) as a function of the frequency content of the signal generated by the rotation of the turbocharger (12) detected by the sensor (25);

building a band-pass filter as a function of the average rotation speed (w) of the turbocharger (12);

filtering, by means of the band-pass filter, the signal generated by the rotation of the turbocharger (12) detected by the sensor (25); and calculating the instantaneous rotation speed ($w_{TC}$) of the turbocharger (12) as a function of the period ($\Delta t[s]$) of the signal generated by the rotation of the turbocharger (12) detected by the sensor (25) and filtered by means of the band-pass filter.

3. A method according to claim 2, wherein the instantaneous rotation speed ($w_{TC}$) of the turbocharger (12) is calculated as a function of the period ($\Delta t[s]$) of the signal generated by the rotation of the turbocharger (12) detected by the first sensor (25) and filtered by means of the band-pass filter by means of the following formula:

$$w_{TC}[rpm] = 60/N*(1/\Delta t[s]) \quad [1]$$

$w_{TC}[rpm]$: instantaneous rotation speed of the turbocharger (12);

N: number of blades of the compressor (14);

$\Delta t[s]$: period of the signal generated by the rotation of the turbocharger (12) and filtered by means of the band-pass filter.

4. A method according to claim 2, wherein the period ($\Delta t[s]$) of the signal generated by the rotation of the turbocharger (12) and filtered by means of the band-pass filter is calculated at the points in which the signal generated by the rotation of the turbocharger (12) and filtered by means of the band-pass filter takes a value of zero.

5. A method according to claim 4, wherein the period ($\Delta t[s]$) of the signal generated by the rotation of the turbocharger (12) and filtered by means of the band-pass filter is calculated at the points in which the signal generated by the rotation of the turbocharger (12) and filtered by means of the band-pass filter takes a value of zero in the descending segments of the signal generated by the rotation of the turbocharger (12) and filtered by means of the band-pass filter.

6. A method according to claim 4, wherein the period ($\Delta t[s]$) of the signal generated by the rotation of the turbocharger (12) and filtered by means of the band-pass filter is calculated at the points in which the signal generated by the rotation of the turbocharger (12) and filtered by means of the band-pass filter takes a value of zero in the ascending segments of the signal generated by the rotation of the turbocharger (12) and filtered by means of the band-pass filter.

7. A method according to claim 2, and comprising the further steps of:

identifying the maximum amplitude frequencies in the frequency content of the signal generated by the rotation of the turbocharger (12); and determining the average rotation speed (w) of the turbocharger (12) using the maximum amplitude frequencies in the frequency content of the signal generated by the rotation of the turbocharger (12).

8. A method according to claim 2, wherein the step of building a band-pass filter as a function of the average rotation speed (w) of the turbocharger (12) comprises the sub-step of determining an upper cutoff frequency value ($w_{tH}$) and a lower cutoff frequency value ($w_{tL}$) of the band-pass filter as a function of the average rotation speed (w) of the turbocharger (12).

9. A method according to claim 8, wherein the upper cutoff frequency value ($w_{tH}$) and the lower cutoff frequency value ($w_{tL}$) define a frequency range centered on the average rotation speed (w) of the turbocharger (12).

10. A method according to claim 2, and comprising the further steps of:

detecting, by means of a second sensor (25), the intensity of a signal generated by the rotation of the turbocharger (12);

determining a frequency content of the signal generated by the rotation of the turbocharger (12) detected by the second sensor (25); and determining the instantaneous rotation speed ($w_{TC\_microphone}$, $w_{TC\_accelerometer}$) of the turbocharger (12) as a function of the frequency content of the signal generated by the rotation of the turbocharger (12) detected by the second sensor (25); and diagnosing a fault when the difference in absolute value between the instantaneous rotation speed ($w_{TC\_microphone}$, $w_{TC\_accelerometer}$) of the turbocharger (12) as a function of the frequency content of the signal generated by the rotation of the turbocharger (12) detected by the first sensor (25) and the instantaneous rotation speed ($w_{TC\_microphone}$, $w_{TC\_accelerometer}$) of the turbocharger (12) as a function of the frequency content of the signal generated by the rotation of the turbocharger (12) detected by the second sensor (25) exceeds a threshold value.

11. A method according to claim 1, wherein the instantaneous rotation speed ($w_{TC}$) of the turbocharger (12) is calculated by means of a sensor designed to detect the passage of the blades (28) of the compressor (14) and to determine the instantaneous rotation speed ($w_{TC}$) of the turbocharger (12) itself as a function of the frequency of passage of the blades (28) of the compressor (14).

12. A method according to claim 1 and comprising the further step of determining the temperature ($T_3$) upstream of the turbine (13) by means of the following formula:

$$T_3 = \frac{\overline{P}_T}{\dot{m} * \eta_T * \left(1 - \left(\frac{p_4}{p_3}\right)^{\frac{\gamma-1}{\gamma}}\right)} \quad [12]$$

$\overline{P}_T$: average power delivered by the turbine (13);

$\dot{m}$: gas flow rate flowing through the turbine (13);

$\eta_T$: internal efficiency of the turbine (13);

$p_3$: pressure upstream of the turbine (13);
$p_4$: pressure downstream of the turbine (13);
$T_3$: temperature upstream of the turbine (13); and
γ: specific heat of the exhaust gases flowing through the turbine (13).

13. A method according to claim 1 and comprising the further step of determining the pressure ($p_3$) upstream of the turbine (13) by means of the following formula:

$$p_3 = \frac{p_4}{\sqrt[\frac{\gamma-1}{\gamma}]{1 - \frac{\overline{P_T}}{\dot{m} * \eta_T * T_3}}} \quad [13]$$

$\overline{P_T}$: average power delivered by the turbine (13);
$\dot{m}$: gas flow rate flowing through the turbine (13);
$\eta_T$: internal efficiency of the turbine (13);
$p_3$: pressure upstream of the turbine (13);
$p_4$: pressure downstream of the turbine (13);
$T_3$: temperature upstream of the turbine (13); and
γ: specific heat of the exhaust gases flowing through the turbine (13).

14. A method according to claim 1 and comprising the further step of determining the temperature ($T_4$) downstream of the turbine (13) by means of the following formula:

$$T_4 = \frac{\overline{P_T}}{\dot{m} * \eta_T * \left(\left(\frac{p_3}{p_4}\right)^{\frac{\gamma-1}{\gamma}} - 1\right)} \quad [15]$$

$\overline{P_T}$: average power delivered by the turbine (13);
$\dot{m}$: gas flow rate flowing through the turbine (13);
$\eta_T$: internal efficiency of the turbine (13);
$p_3$: pressure upstream of the turbine (13);
$p_4$: pressure downstream of the turbine (13);
$T_3$: temperature upstream of the turbine (13); and
γ: specific heat of the exhaust gases flowing through the turbine (13).

15. A method according to claim 1 and comprising the further step of determining the pressure ($p_4$) downstream of the turbine (13) by means of the following formula:

$$p_4 = \frac{p_3}{\sqrt[\frac{\gamma-1}{\gamma}]{1 + \frac{\overline{P_T}}{\dot{m} * \eta_T * T_4}}} \quad [16]$$

$\overline{P_T}$: average power delivered by the turbine (13);
$\dot{m}$: gas flow rate flowing through the turbine (13);
$\eta_T$: internal efficiency of the turbine (13);
$p_3$: pressure upstream of the turbine (13);
$p_4$: pressure downstream of the turbine (13);
$T_3$: temperature upstream of the turbine (13); and
γ: specific heat of the exhaust gases flowing through the turbine (13).

16. A method according to claim 1 and comprising the further step of determining the gas flow rate ($\dot{m}$) flowing through the turbine (13) by means of any one of the two following formulas:

$$\dot{m} = \frac{\overline{P_T}}{T_3 * \eta_T * \left(1 - \left(\frac{p_4}{p_3}\right)^{\frac{\gamma-1}{\gamma}}\right)} \quad [24]$$

$$\dot{m} = \frac{\overline{P_T}}{T_4 * \eta_T * \left(\left(\frac{p_3}{p_4}\right)^{\frac{\gamma-1}{\gamma}} - 1\right)} \quad [25]$$

$\overline{P_T}$: average power delivered by the turbine (13);
$\dot{m}$: gas flow rate flowing through the turbine (13);
$\eta_T$: internal efficiency of the turbine (13);
$p_3$: pressure upstream of the turbine (13);
$p_4$: pressure downstream of the turbine (13);
$T_3$: temperature upstream of the turbine (13);
$T_4$: temperature downstream of the turbine (13); and
γ: specific heat of the exhaust gases flowing through the turbine (13).

17. A method according to claim 1 and comprising the further step of adjusting the quantity of lubricating fluid for the turbocharger (12) to be circulated as a function of the average power ($\overline{P_T}$) delivered by the turbine (13).

18. A method according to claim 1 and comprising the further step of determining the average power ($\overline{P_C}$) delivered by the compressor (14) by means of the following formula:

$$\overline{P_C} = \frac{1}{\eta_C} * \eta_0 * \overline{P_T} \quad [17]$$

$\overline{P_T}$: average value of the power delivered by the turbine (13);
$\overline{P_C}$: average value of the power delivered by the compressor (14);
$\eta_C$: internal efficiency of the compressor (14); and
$\eta_0$: organic efficiency of the turbocharger (12).

19. A method according to claim 18 and comprising the further step of determining the temperature ($T_1$) upstream of the compressor (14) by means of the following formula:

$$T_1 = \frac{\overline{P_C}}{\dot{m} * \eta_C * \left(\left(\frac{p_2}{p_1}\right)^{\frac{\gamma-1}{\gamma}} - 1\right)} \quad [19]$$

$\overline{P_C}$: average value of the power delivered by the compressor (14);
$\dot{m}$: flow rate of the gas mixture (air and possible recirculated exhaust gases) flowing through the compressor (14);
$\eta_C$: internal efficiency of the compressor (14);
$p_1$: pressure upstream of the compressor (14);
$p_2$: pressure downstream of the compressor (14);
$T_1$: temperature upstream of the compressor (14); and
γ: specific heat of the gas mixture (air and possible recirculated exhaust gases) flowing through the compressor (14).

20. A method according to claim 18 and comprising the further step of determining the pressure ($p_1$) upstream of the compressor (14) by means of the following formula:

$$p_1 = \frac{p_2}{\sqrt[\frac{\gamma-1}{\gamma}]{1 + \frac{\overline{P_C}}{\dot{m} * \eta_C * T_1}}} \qquad [20]$$

$\overline{P_C}$: average value of the power delivered by the compressor (14);
$\dot{m}$: flow rate of the gas mixture (air and possible recirculated exhaust gases) flowing through the compressor (14);
$\eta_C$: internal efficiency of the compressor (14);
$p_1$: pressure upstream of the compressor (14);
$p_2$: pressure downstream of the compressor (14);
$T_1$: temperature upstream of the compressor (14); and
$\gamma$: specific heat of the gas mixture (air and possible recirculated exhaust gases) flowing through the compressor (14).

21. A method according to claim 18 and comprising the further step of determining the temperature ($T_2$) downstream of the compressor (14) by means of the following formula:

$$T_1 = \frac{\overline{P_C}}{\dot{m} * \eta_C * \left(1 - 1 \Big/ \left(\frac{p_2}{p_1}\right)^{\frac{\gamma-1}{\gamma}}\right)} \qquad [22]$$

$\overline{P_C}$: average value of the power delivered by the compressor (14);
$\dot{m}$: flow rate of the gas mixture (air and possible recirculated exhaust gases) flowing through the compressor (14);
$\eta_C$: internal efficiency of the compressor (14);
$p_1$: pressure upstream of the compressor (14);
$p_2$: pressure downstream of the compressor (14);
$T_2$: temperature downstream of the compressor (14); and
$\gamma$: specific heat of the gas mixture (air and possible recirculated exhaust gases) flowing through the compressor (14).

22. A method according to claim 18 and comprising the further step of determining the pressure value ($p_2$) downstream of the compressor (14) by means of the following formula:

$$p_2 = \frac{p_1}{\sqrt[\frac{\gamma-1}{\gamma}]{1 - \frac{\overline{P_C}}{\dot{m} * \eta_C * T_2}}} \qquad [23]$$

$\overline{P_C}$: average value of the power delivered by the compressor (14);
$\dot{m}$: flow rate of the gas mixture (air and possible recirculated exhaust gases) flowing through the compressor (14);
$\eta_C$: internal efficiency of the compressor (14);
$p_1$: pressure upstream of the compressor (14);
$p_2$: pressure downstream of the compressor (14);
$T_2$: temperature downstream of the compressor (14); and
$\gamma$: specific heat of the gas mixture (air and possible recirculated exhaust gases) flowing through the compressor (14).

23. A method according to claim 18 and comprising the further step of determining the flow rate ($\dot{m}$) of the gas mixture flowing through the compressor (14) by means of any one of the two following formulas:

$$\dot{m} = \frac{\overline{P_C}}{T_2 * \eta_2 * \left(1 - 1 \Big/ \left(\frac{p_2}{p_1}\right)^{\frac{\gamma-1}{\gamma}}\right)} \qquad [26]$$

$$\dot{m} = \frac{\overline{P_C}}{T_1 * \eta_C * \left(\left(\frac{p_2}{p_1}\right)^{\frac{\gamma-1}{\gamma}} - 1\right)} \qquad [27]$$

$\overline{P_C}$: average value of the power delivered by the compressor (14);
$\dot{m}$: flow rate of the gas mixture (air and possible recirculated exhaust gases) flowing through the compressor (14);
$\eta_C$: internal efficiency of the compressor (14);
$p_1$: pressure upstream of the compressor (14);
$p_2$: pressure downstream of the compressor (14);
$T_1$: temperature upstream of the compressor (14);
$T_2$: temperature downstream of the compressor (14); and
$\gamma$: specific heat of the gas mixture (air and possible recirculated exhaust gases) flowing through the compressor (14).

* * * * *

UNITED STATES PATENT AND TRADEMARK OFFICE
CERTIFICATE OF CORRECTION

PATENT NO.         : 9,617,931 B2
APPLICATION NO.    : 14/679552
DATED              : April 11, 2017
INVENTOR(S)        : Matteo de Cesare et al.

It is certified that error appears in the above-identified patent and that said Letters Patent is hereby corrected as shown below:

In the Claims

Column 22, Line 25 (Claim 23):
Delete equation [26] and replace with the correct equation [26] below $$\dot{m} = \frac{\overline{P}_C}{T_2 * \eta_C * \left(1 - 1 / \left(\frac{p_2}{p_1}\right)^{\frac{\gamma-1}{\gamma}}\right)} \quad [26]$$

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*